UNITED STATES PATENT OFFICE.

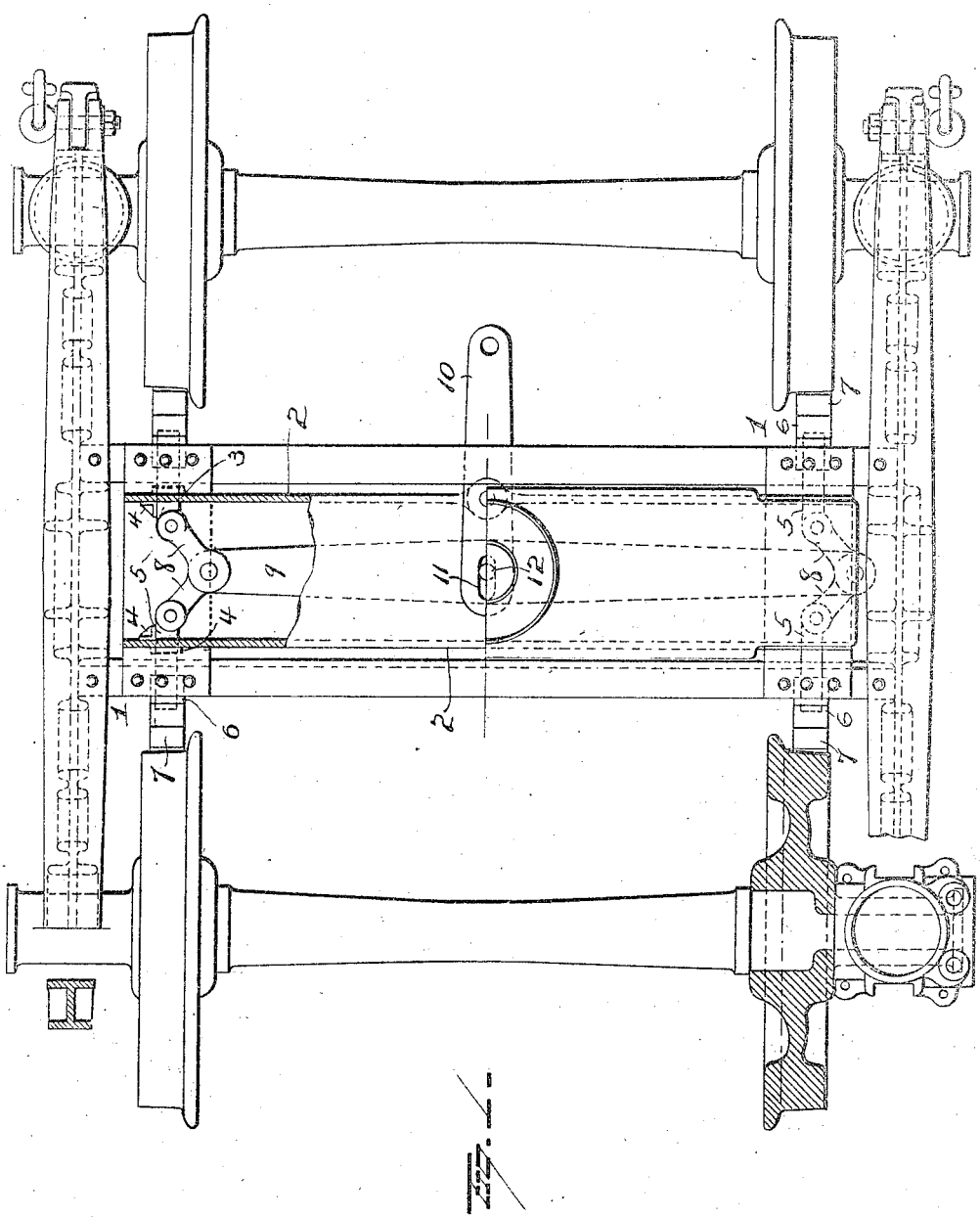

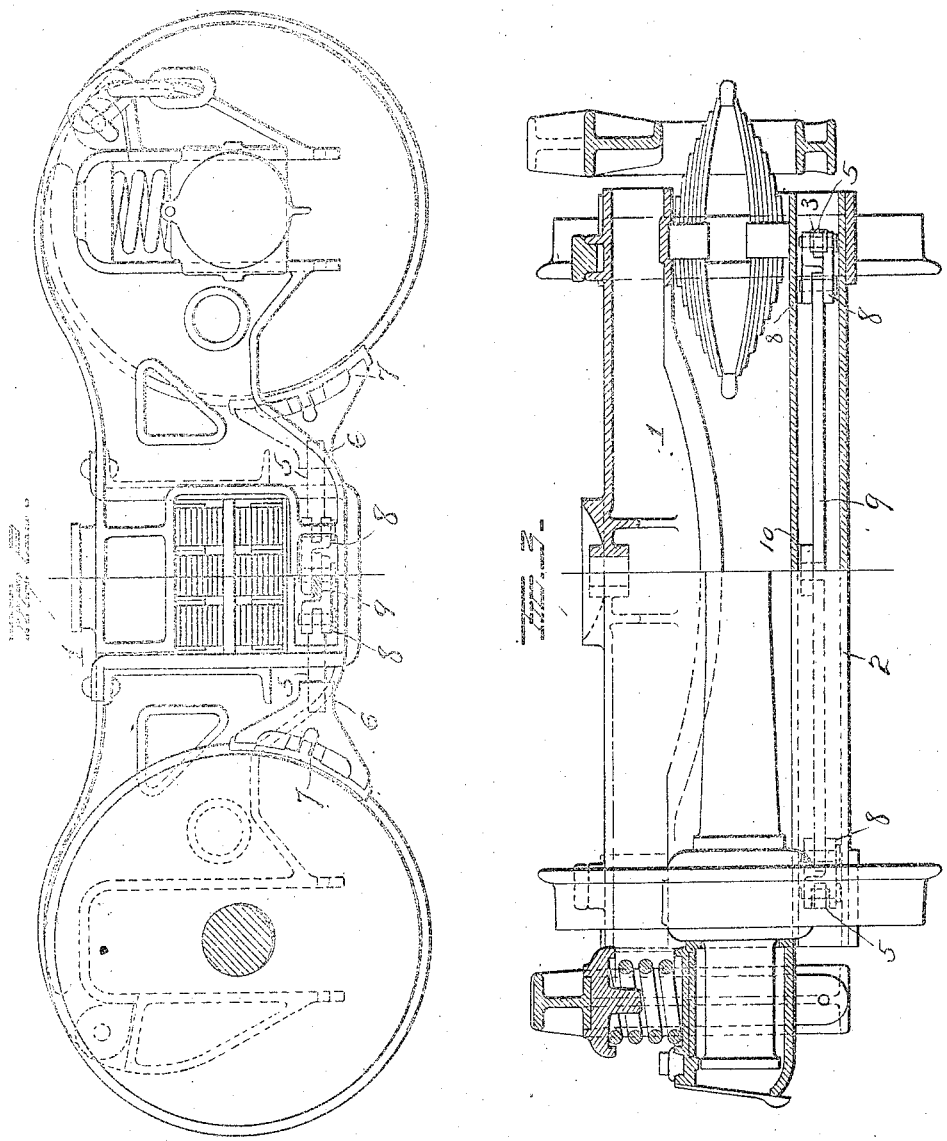

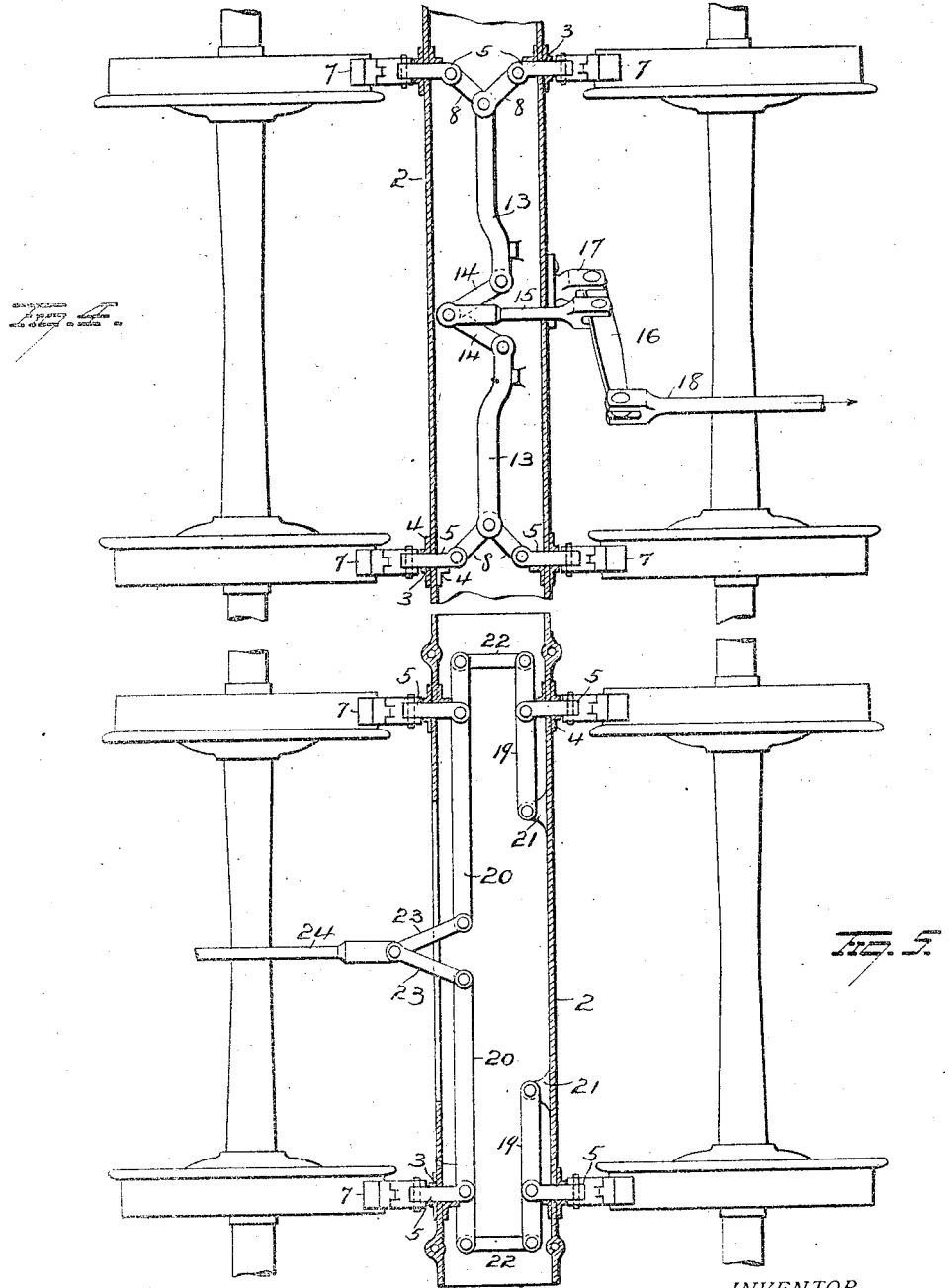

COLUMBUS PHILLIPS, OF MERIDIAN, MISSISSIPPI, ASSIGNOR OF ONE-THIRD TO GEORGE GROOBEY, OF ATLANTA, GEORGIA.

CAR-BRAKE.

934,568.  Specification of Letters Patent.  Patented Sept. 21, 1909.

Application filed November 5, 1908. Serial No. 461,218.

*To all whom it may concern:*

Be it known that I, COLUMBUS PHILLIPS, of Meridian, in the county of Lauderdale and State of Mississippi, have invented certain new and useful Improvements in Car-Brakes; and I do hereby declare the following to be a full, clear, and exact description of the invention, such as will enable others skilled in the art to which it appertains to make and use the same.

This invention relates to improvements in car brakes,—one object of the invention being to so construct a brake mechanism that the shoes will be forced in a straight line against the peripheral faces of the wheels, and to so mount the shoes that their proper position to engage the wheels will be maintained.

A further object is to avoid the use of brake-beams with suspended brake-shoes, and to inclose the operating mechanism for brake-shoes movable in straight lines substantially at right angles to the peripheral faces of the wheels.

A further object is to provide a brake mechanism in which the braking force will be transmitted by a direct push of the brake-shoes against the peripheral faces of the wheels.

A further object is to provide a brake mechanism in which the strain will be equally distributed and operate to apply power directly and equally to all the shoes.

A further object is to so construct brake mechanism as to insure safety, avoiding liability of the breaking-off and falling of parts thereof, and to so construct and arrange such mechanism that it shall be sure and effectual in operation.

With these objects in view the invention consists in certain novel features of construction and combinations of parts as hereinafter set forth and pointed out in the claims.

In the accompanying drawings, Figure 1 is a plan view partly in section of a car truck showing one embodiment of my invention. Fig. 2 is a side elevation, partly in section, of the same. Fig. 3 is a view partly in front elevation and partly in section of a car truck with my improvements applied thereto, and Figs. 4 and 5 are views illustrating modifications.

1 represents a car truck, the spring-board of which is made in the form of a rectangular box 2. This hollow spring-board serves to inclose my improved brake mechanism and effectually protect the same. The vertical sides of the spring-board are provided in proximity to respective ends thereof with openings 3 and at these points said vertical walls are reinforced as shown at 4 to form bearings for sliding bars 5. Each bar 5 is made angular in cross-section and enters an angular socket made in the head 6 of a brake-shoe 7. The brake-shoes are therefore carried by the bars 5 and the latter passing through angular openings in the walls of the hollow-spring-board and inserted in angular sockets in the heads of the brake-shoes,—the latter will be prevented from turning and will therefore always be in proper position to engage the peripheral faces of the wheels when the bars 5 are pushed outwardly in straight lines, by means of mechanism which I will now describe.

The sliding bars 5 at each end of the spring-board are connected by toggle-levers 8 and the toggle-levers at respective ends of the spring-board are connected by a rod or bar 9. At a point centrally between the ends of the spring-board, a lever 10 passes through and is pivotally supported in one side wall of said spring-board. The inner end of this lever is provided with an elongated slot 11 to receive a pin 12 projecting from the rod or bar 9, while the outer end of said lever is adapted for the attachment of connecting means with the piston rod of the brake-cylinders.

By mounting the sliding bars 5 which carry the brake-shoes, in the vertical walls of the hollow-spring-board, as hereinbefore described, I am enabled to avoid the use of brake-beams and the suspending of the brake-shoes from such beams as employed in prior constructions, and I therefore obviate liability of the breaking-off or falling of parts of such prior constructions and avoid also other objectionable features incident to such prior constructions.

The lever mechanism for operating the brake-shoe bars 5 may be constructed differently from that above described and shown in Fig. 1 of the drawings. For instance, instead of employing a single rod or bar 9 to connect the toggles at respective ends of the spring-board, two bars or links 13 may be employed, as shown in Fig. 4 and connected at their inner ends centrally between the ends of the spring-board, with a toggle-lever 14. One end of a rod 15 is attached to the toggle-lever 14 and passes freely through a vertical wall of the hollow spring-board. The outer end of the rod 15 is pivotally attached to a lever 16, one end of which is mounted in a bracket 17 secured to the spring-board and the other end has connected thereto a rod 18 for attachment to the air brake mechanism.

In the construction shown in Fig. 5, the toggle-levers, such as shown at 8 in Fig. 1 are dispensed with and the brake shoe bars 5 are connected with levers 19—20. Each lever 19 is pivotally attached to a suitable bracket 21 secured to the spring-board and the outer ends of each pair of levers 19—20 are connected by means of a link 22. The levers 20 are made of sufficient length to extend approximately to the center of the spring-board where they are connected by means of links 23 with a rod or bar 24 to be connected with the air brake devices.

Other lever mechanisms may be employed for sliding the bars 5 and operating the brake-shoes, without departing from the spirit of my invention or limiting its scope and hence I do not wish to restrict myself to the details of construction herein set forth.

Having fully described my invention what I claim as new and desire to secure by Letters-Patent, is,—

1. The combination with a truck provided with a hollow-spring-board, of sliding brake-shoe bars supported by said spring-board, brake-shoes carried by said bars, and lever mechanism inclosed with said hollow spring-board for sliding said brake-shoe bars.

2. The combination with a truck provided with a hollow-spring-board having angular openings in its vertical walls, of angular brake-shoe bars adapted to move longitudinally through said openings, brake-shoes having angular sockets for the reception of said brake-shoe bars, and lever mechanism disposed within said hollow spring-board for sliding the brake-shoe bars and pushing the brake-shoes against the peripheral faces of the wheels.

3. The combination with a truck provided with a hollow-spring-board having openings in its vertical walls near the ends thereof and approximately in line with the wheels of the truck, of longitudinally movable bars passing through said openings of the spring-board, brake-shoes carried by the outer ends of said longitudinally movable bars, toggle-levers located within the hollow spring board and connecting the longitudinally movable bars in pairs, a rod or bar also located within the spring board, and connecting the toggle levers, and a pivoted lever connected with said last mentioned rod or bar and projecting laterally beyond the hollow spring board.

In testimony whereof, I have signed this specification in the presence of two subscribing witnesses.

COLUMBUS PHILLIPS.

Witnesses:
   Phil Dross,
   H. E. Wadsworth.